United States Patent [19]

Suzuki

[11] Patent Number: 4,855,762

[45] **Date of Patent: * Aug. 8, 1989**

[54] INK STORING DEVICE

[75] Inventor: Tetsuo Suzuki, Yokohama, Japan

[73] Assignee: Canon Kabushiki Kaisha, Tokyo, Japan

[ * ] Notice: The portion of the term of this patent subsequent to May 19, 2004 has been disclaimed.

[21] Appl. No.: 52,202

[22] Filed: May 19, 1987

Related U.S. Application Data

[63] Continuation of Ser. No. 485,289, Apr. 15, 1983, abandoned.

[30] Foreign Application Priority Data

May 10, 1982 [JP] Japan .................................. 57-76615

[51] Int. Cl.4 ............................................ G01D 15/18
[52] U.S. Cl. .................................... 346/140 R; 346/75
[58] Field of Search .............................. 346/75, 140 R

[56] References Cited

U.S. PATENT DOCUMENTS

| | | | |
|---|---|---|---|
| 3,056,384 | 10/1962 | Beale et al. . | |
| 3,121,138 | 2/1964 | Murphy . | |
| 3,386,102 | 5/1968 | Scheuzger et al. . | |
| 3,482,258 | 12/1969 | Steen . | |
| 3,945,022 | 3/1976 | Distler . | |
| 4,121,222 | 10/1978 | Diebold . | |
| 4,148,041 | 4/1979 | Rosenstock . | |
| 4,183,031 | 1/1980 | Kyser et al. . | |
| 4,291,317 | 9/1981 | Corwin et al. . | |
| 4,320,406 | 3/1982 | Heinzl . | |
| 4,329,698 | 5/1982 | Smith . | |
| 4,367,482 | 1/1983 | Heinzl | 346/140 R |
| 4,383,263 | 5/1983 | Ozawa . | |
| 4,386,861 | 6/1983 | Kurihara et al. | 400/124 |
| 4,437,104 | 3/1984 | Hudson | 346/140 R |
| 4,447,820 | 5/1984 | Terasawa | 346/140 R |
| 4,695,824 | 9/1987 | Tazaki | 346/140 R |

FOREIGN PATENT DOCUMENTS

| | | | |
|---|---|---|---|
| 2812562 | 3/1978 | Fed. Rep. of Germany | 346/140 R |
| 2709730 | 9/1978 | Fed. Rep. of Germany | 346/140 R |
| 54-49696 | 4/1979 | Japan | 346/140 R |

OTHER PUBLICATIONS

Techni-Tool, Cat. No. 25, p. 170, 1981.

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

An ink storing device comprises a first storing portion storing one type of ink therein and a second storing portion having the interior thereof divided into a plurality of spaces and storing a plurality of types of inks therein.

3 Claims, 1 Drawing Sheet

INK STORING DEVICE

This application is a continuation of application Ser. No. 485,289 filed Apr. 15, 1983, now abandoned.

BACKGROUND OF THE INVENTION

1. Field of the Invention

This invention relates to an ink storing device for use with an ink jet printer, and more particularly to such ink storing device in which the construction of storing means is improved.

2. Description of the Prior Art

Generally in a multi-color ink jet printer, cyan, magenta, yellow and black inks are used to effect a color output and ink tanks containing the respective inks therein are contained in discrete ink cassette cases which can be freely replaced with new ink cassette cases.

There is also adopted a construction in which the aforementioned four ink tanks are contained in a single ink cassette case.

The adoption of the structure in which the discrete ink cassette cases are provided necessitates providing a plurality of ink cassette cases and accordingly leads to a high cost and poor operability.

Also, the case where a plurality of ink tanks are contained within a single ink cassette case means that an ink tank in which the amount of ink consumption is great and ink tanks in which the amount of ink consumption is small are contained in a single ink cassette case, and in such case, it may happen that the ink cassette case must be replaced with a new one even when inks of other colors still remain in the ink tanks, and this may result in a waste of ink. Further, the fact that a plurality of ink tanks each requiring a predetermined volume are contained within a single ink cassette case leads to the bulkiness of the cassette case itself which means an economical disadvantage.

SUMMARY OF THE INVENTION

It is an object of the present invention to provide an effective ink storing device.

It is another object of the present invention to eliminate the waste of inks.

It is still another object of the present invention to facilitate ink replenishment.

It is yet still another object of the present invention to make the ink storing device compact.

Other objects of the present invention will become apparent from the following detailed description taken in conjunction with the accompanying drawings.

BRIEF DESCRIPTION OF THE DRAWING

An embodiment of the present invention is illustrated in the drawings, in which.

DESCRIPTION OF THE PREFERRED EMBODIMENTS

Figure 1:
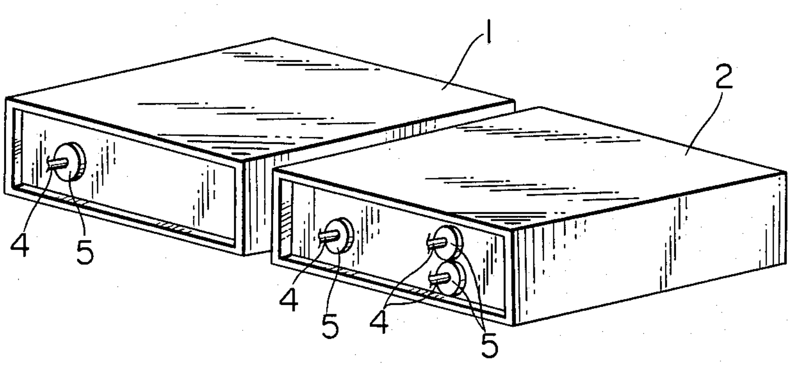
FIG. 1 is a perspective view of ink cassette cases.
Figure 2:
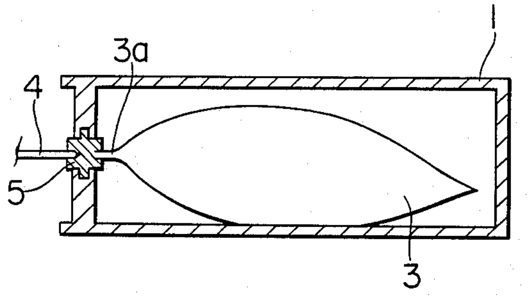
FIG. 2 is a longitudinal cross-sectional view of an ink cassette case which contains therewithin an ink tank in which the amount of ink consumption is great.
Figure 3:
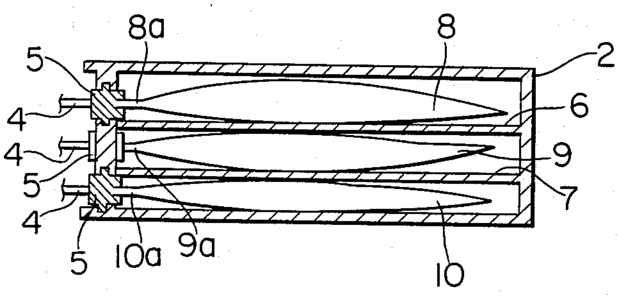
FIG. 3 is a longitudinal cross-sectional view of an ink cassette case which contains therewithin a plurality of ink tanks in which the amount of ink consumption is small.

Referring to FIGS. 1 to 3 which illustrate an embodiment of the present invention, reference numeral 1 designates an ink cassette case containing therein an ink tank in which the amount of ink consumption is great, and reference numeral 2 denotes an ink cassette case containing therein a plurality of ink tanks in which the amount of ink consumption is small. Within the ink cassette case 1, as shown in FIG. 2, there is contained a flexible ink tank 3 in which the amount of ink consumption is great. The ink contained in this ink tank 3 is, for example, black ink whose amount of consumption is great, and the ink tank 3 is contained as a large ink tank within the cassette case 1. A rubber plug 5 which is an outlet portion for letting out the ink is mounted in the supply port **3*a* of the ink tank 3 and is fixed to a side wall of the ink cassette case 1. A needle 4 provided at one end of a tube connected to a nozzle, not shown, in fixed to a printer body (not shown). When the ink cassette case 1 is inserted into the printer body, the needle 4 may be inserted into the rubber plug 5, whereby the supply port 3*a* of the ink tank 3 and the needle 4** may be connected together to permit the ink to be supplied.

On the other hand, the ink tanks containing therein inks whose amount of consumption is small are contained within the ink cassette case 2.

That is, as shown in FIG. 3, horizontal partition plates 6 and 7 are provided within the ink cassette case 2 to divide the interior thereof into three equal spaces.

A flexible ink tank 8 containing, for example, cyan ink therein is contained within the space above the partition plate 6, a flexible ink tank 9 containing magenta ink therein is contained within the space between the partition plates 6 and 7, and a flexible ink tank 10 containing yellow ink therein is contained within the lowermost space.

Rubber plugs 5 are mounted in the supply ports **8*a*–10*a* of the ink tanks 8–10 in the same manner as described previously and are fixed to a side wall of the cassette case 2. These rubber plugs 5** are disposed in spaced apart and staggered relationship with each other so that adjacent plugs are not proximate to each other.

When the cassette case 2 is inserted into the printer body, a needle 4 provided at one end of each of tubes (not shown) connected to nozzles may be inserted into each of the rubber plugs 5 to permit the ink to be supplied.

Of course, the spaces containing the ink tanks 8–10 are formed as such spaces that do not impart pressure to the ink tanks 8–10.

As a second embodiment, the ink cassette cases 1 and 2 may be formed to the entirely identical size as shown in FIG. 1 and the partition plates 6 and 7 may be made removable. Thus, the ink cassette cases used will become entirely identical in size and shape and can be manufactured very economically as compared with a case where ink cassette cases of different sizes and shapes are manufactured. As required, one of these ink cassette cases may be utilized as the ink cassette case 1 containing therein only the ink tank which contains therein the ink whose amount of consumption is greatest and the other ink cassette case may be utilized as the ink cassette case 2 containing therein the ink tanks in which the amount of ink consumption is smaller.

Three rubber plugs 5 may be provided in each of these ink cassette cases, or alternatively a rubber plug may be provided in one of the ink cassette cases and three rubber plugs may be provided in the other ink cassette case.

The present embodiment, as described above, adopts a structure in which the ink cassette is separated into two ink cassette cases, that is, an ink tank of a larger volume containing therein the ink whose amount of consumption is great is contained within one ink cassette case and a plurality of other ink tanks are contained within the other ink cassette case. Therefore, the ink tank in which the amount of ink consumption is great can be made into a large volume and this eliminates the need to replace the cassette case with new one so frequently. Also, as compared with a case where all ink tanks are contained within an ink cassette case, the waste of replacing the ink cassette case with new one in spite of the fact that some of the ink tanks within the ink cassette case still contain inks therein when the ink tank in which the amount of ink consumption is great has become empty is eliminated.

Further, the use of two ink cassette cases, as compared with the structure in which more than two ink cassette cases are used, leads to the possibility of reducing the occupied space and accordingly increases the compactness of the device.

Furthermore, the use of two ink cassette cases leads to greater ease with which the cassette cases are replaced with new ones.

In the above-described embodiments, as shown in FIG. 3, the ink cassette case containing a plurality of ink tanks therein is vertically divided into three spaces by the partition plates 6 and 7, but alternatively, such ink cassette case may of course be horizontally divided into three spaces.

As will be apparent from the foregoing description, according to the present invention, use is made of two ink cassette cases one of which contains therein an ink tank in which the amount of ink consumption is great and the other contains therein a plurality of ink tanks in which the amount of ink consumption is small, and this leads to the possibility of increasing the volume of the ink cassette case containing therein an ink tank in which the amount of ink consumption is great and which is high in the frequency of replacement, and accordingly the possibility of decreasing the frequency of replacement of such ink cassette case. Also, the use of two ink cassette cases leads to the reduction in the space occupied in the device and accordingly increases the compactness of the device. Moreover, the ink cassette case containing therein the ink tanks in which the amount of ink consumption is small is separate from the ink cassette case containing therein the ink tank in which the amount of ink consumption is great, and this eliminates the waste of ink resulting from replacing the ink cassette case in spite of its still containing inks of other colors therein.

What I claim is:

1. An ink storage device for supplying a plurality of types of ink to a recording system, the ink storage device comprising first and second ink storing means that are individually removable from said ink storage device wherein:

said first storage means includes a first case having interiorly thereof a storage space having therein a first flexible ink tank holding one color of ink;

said second ink storing means includes a second case separate from said first case and having substantially the same size and shape as said first case, the interior of said second case being divided by at least one partition into a plurality of storage spaces having therein a plurality of additional flexible ink tanks holding a plurality of colors of ink different from the color of the ink in the first flexible ink tank;

said first case includes detachable-connection means for enabling an ink outlet tube to be detachably connected to said first case in fluid communication with the first flexible ink tank; and said second case includes a plurality of detachable-connection means for enabling a plurality of ink outlet tubes to be detachably connected to said second case in fluid communication with respective flexible ink tanks in said second case, wherein said plural detachable-connection means included in said second case are disposed at spaced apart positions so that adjacent ones of said plural detachable connection means are not proximate to each other.

2. An ink storage device according to claim 1, wherein said partition is removable.

3. An ink storage device according to claim 1, wherein said detachable-connection means included in said first and second cases comprise elastic plugs pierceable by a hollow needle on the ink outlet tubes.

* * * * *

UNITED STATES PATENT AND TRADEMARK OFFICE
CERTIFICATE OF CORRECTION

PATENT NO. : 4,855,762

DATED : August 8, 1989

INVENTOR(S) : TETSUO SUZUKI

It is certified that error appears in the above-identified patent and that said Letters Patent is hereby corrected as shown below:

COLUMN 1

Line 57, "DRAWING" should read --DRAWINGS--.

COLUMN 2

Line 20, "in" should read --is--.

COLUMN 3

Line 13, "new one" should read --new ones--.

COLUMN 4

Line 15, "said first storage means" should read --said first ink storing means--.

Line 40, "tachable connection" should read --tachable-connection--.

Signed and Sealed this

Eleventh Day of September, 1990

*Attest:*

HARRY F. MANBECK, JR.

*Attesting Officer*

*Commissioner of Patents and Trademarks*